Dec. 8, 1964   A. S. CRUTCHFIELD   3,160,141
EQUIPMENT FOR CLEANING POULTRY HOUSES
Filed Feb. 15, 1963   3 Sheets-Sheet 1

FIG.I.

INVENTOR
Alpheus S. Crutchfield
BY J. Hanson Boyden,
ATTORNEY

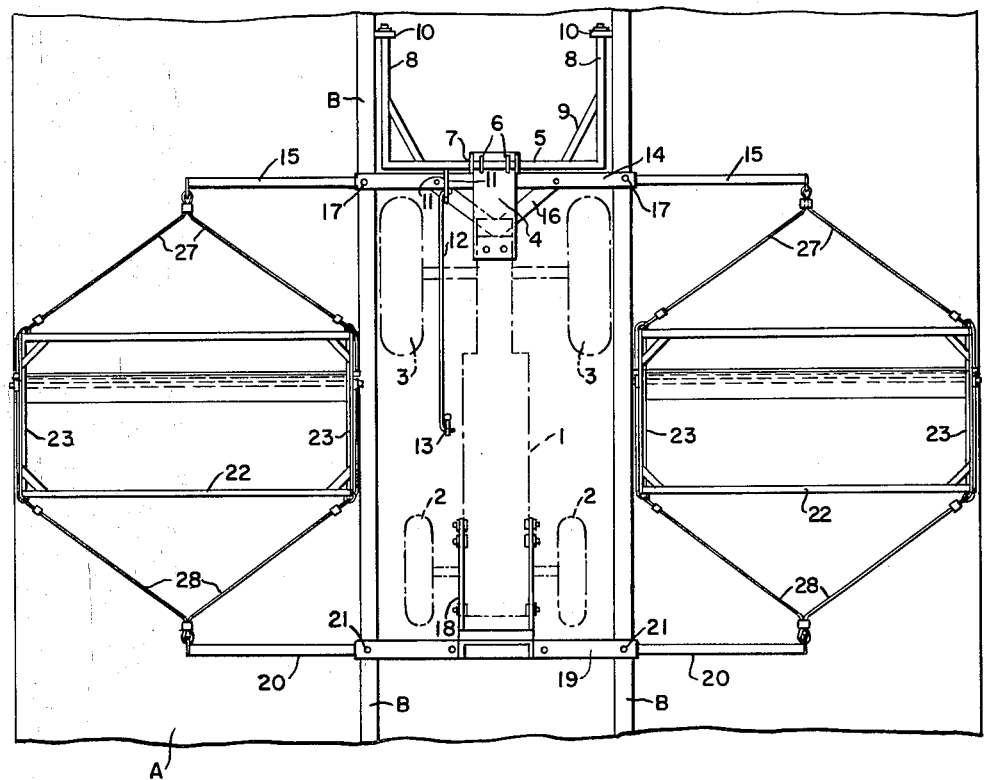
FIG.2.
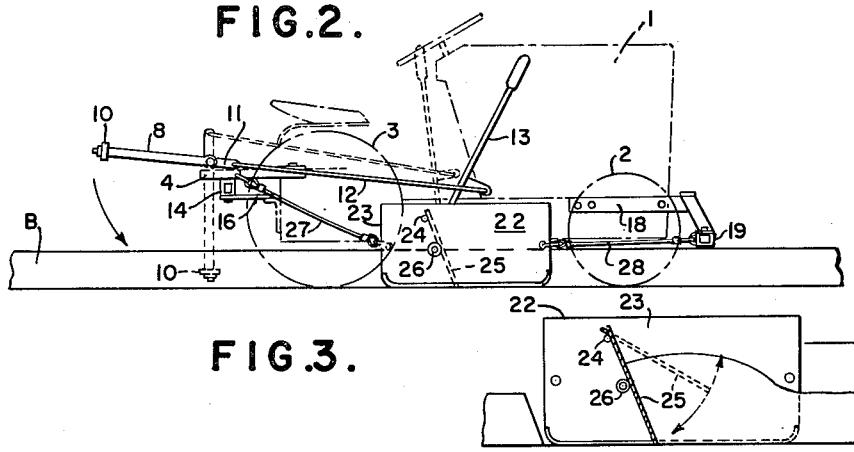
FIG.3.
FIG.5.
INVENTOR
Alpheus S Crutchfield
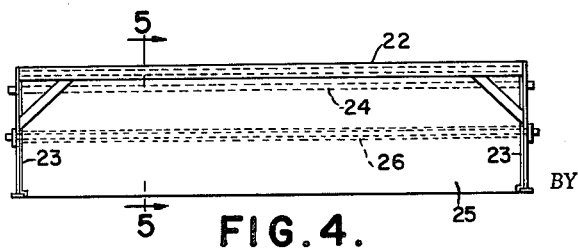
FIG.4.
BY
ATTORNEY Dec. 8, 1964  A. S. CRUTCHFIELD  3,160,141
EQUIPMENT FOR CLEANING POULTRY HOUSES
Filed Feb. 15, 1963  3 Sheets-Sheet 3
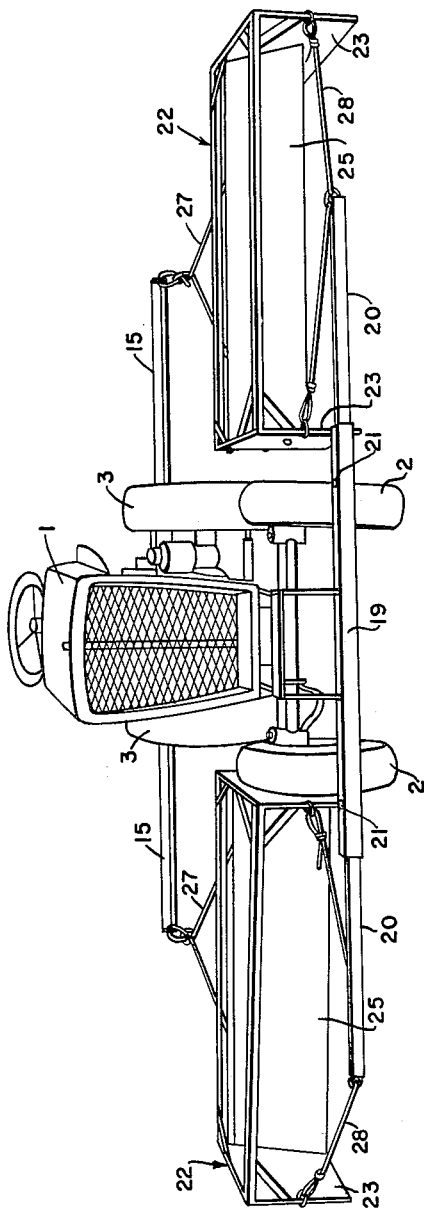
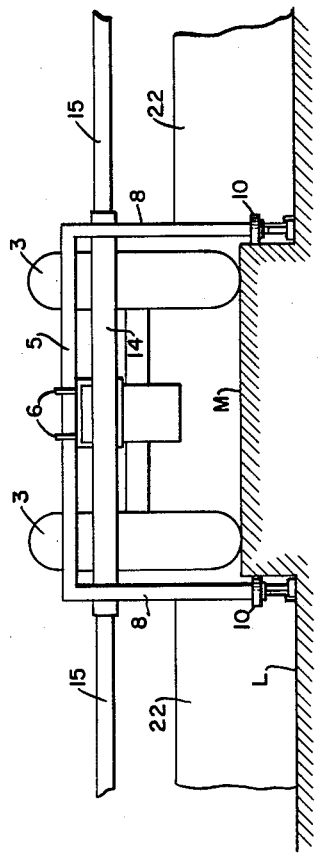
INVENTOR
Alpheus S. Crutchfield
BY J. Hanson Boyden,
ATTORNEY 3,160,141
EQUIPMENT FOR CLEANING POULTRY HOUSES
Alpheus S. Crutchfield, 108 Robin Hood Road,
South Boston, Va.
Filed Feb. 15, 1963, Ser. No. 258,747
8 Claims. (Cl. 119—22)

This invention relates to equipment for cleaning poultry houses, and more particularly commercial poultry houses in which the fowls are kept in cages with wire mesh bottoms.

It is common practice to provide series of such cages arranged in parallel rows and supported at a substantial distance above the floor of the house. This floor is usually made of concrete or other material having a hard, smooth surface, and the droppings fall through the wire mesh bottoms of the cages onto such floor. The floor space beneath each row of cages is commonly referred to as a "pit," and the usual current practice is to clean and remove the accumulated droppings from these pits by hand. This is an extremely laborious and disagreeable job, as well as an expensive one.

An object of the present invention is to provide power-operated means for expeditiously removing the droppings from these pits.

More specifically, an object of the invention is to devise scraper means, in the nature of an attachment for an ordinary farm tractor, for cleaning the droppings from the floors of such pits, thereby greatly reducing the labor cost.

Further objects of the invention are to provide means for effectively steering the tractor along the sides of the pits, when backing up, and to devise a novel construction of scraper blade so designed that it will swing upwardly and ride over the droppings when moved backwardly.

With the above and other objects in view, and to improve generally on the details of such apparatus, the invention consists in the construction and arrangement of parts herein described and claimed, and illustrated in the accompanying drawings, forming part of this specification, and in which:

FIG. 2 is a plan view of a portion of the floor of a poultry house showing my improved cleaning apparatus in position thereon;

FIG. 3 is a side elevation of the apparatus shown in FIG. 2;

FIG. 4 is a front view of one of the special scrapers which I employ;

FIG. 5 is a transverse section substantially on the line 5—5 of FIG. 4, looking in the direction of the arrows;

FIG. 6 is a perspective view of my improved cleaning apparatus; and

FIG. 7 is a transverse section somewhat similar to FIG. 1 but showing a modified arrangement.

Figure 1:
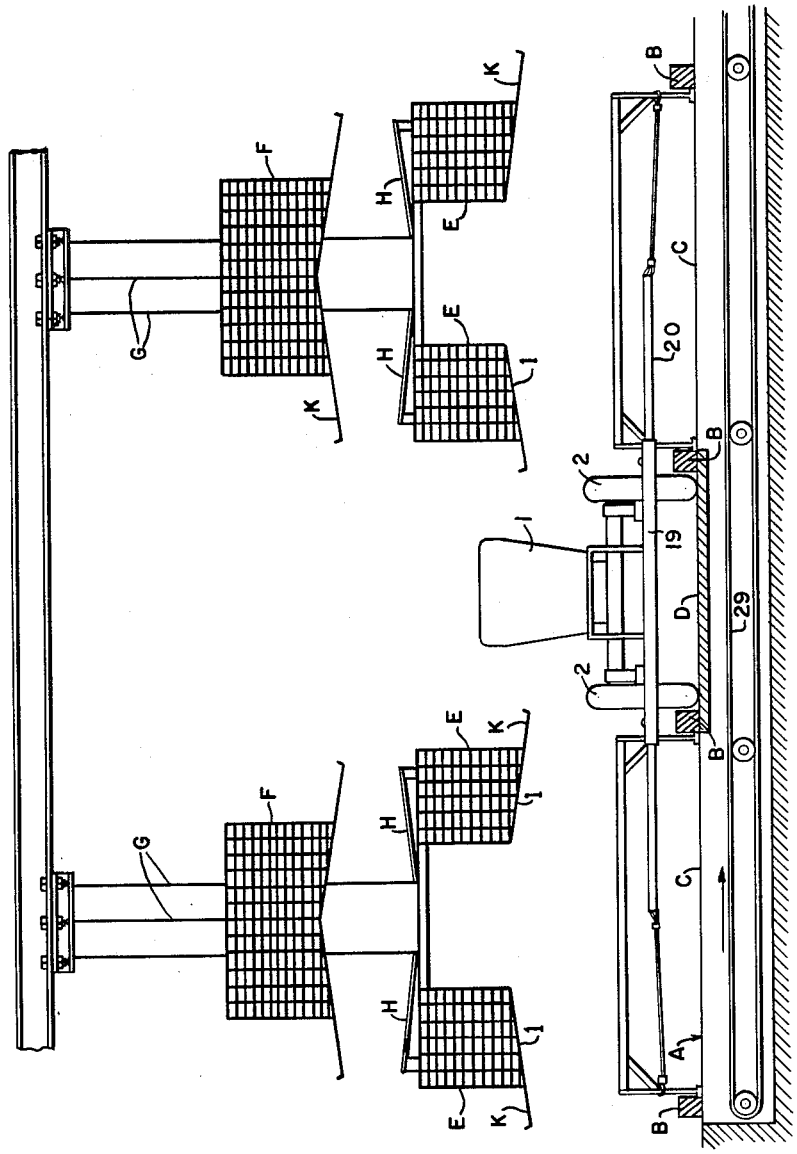
FIG. 1 is a schematic view showing the arrangement of cages in relation to my improved cleaning equipment.

Referring to the drawings in detail, and more particularly first to FIG. 1, A designates the floor of a poultry house which is made of smooth hard material such as concrete. On this floor are secured a plurality of guides or curbs B so spaced as to provide so-called "pits" C and an aisle D between two of the pits.

Two banks of wire cages in which the poultry are confined are shown and disposed above each of the pits C. These cages comprise two series of lower units E over each pit and a series of upper units F disposed above the units E. All of these units are suspended from the framework of the poultry house as by means of wire cables G.

Over each of the cages E of the lower series are placed inwardly inclined platforms H, and each cage has an inclined bottom I extended beyond the cages as shown at K, these extended portions having turned up ends, as illustrated. These inclined bottoms are for the purpose of enabling the eggs to roll down the same into the extensions K where they may be readily gathered by an attendant without the necessity of going into the cages.

The droppings from the lower series of cages E fall downwardly into the pits C, while the droppings from the upper series of cages F fall first upon the platforms H and may then be scraped off of these platforms by any suitable tool toward the space between the cages E so that the droppings fall down between these two series of cages into the pit.

My improved cleaning apparatus comprises a farm type tractor 1 having front steering wheels 2 and rear driving wheels 3. Secured to the frame of the tractor at the rear is a bracket 4 in the nature of a wide shallow channel, and extending transversely of the end of this bracket and rotatably supported on the same is a shaft 5, held in position by U-bolts 6 and collars 7. To each end of the shaft 5 is secured an arm 8 rigidly held by a brace 9. At the free end of each arm 8 is mounted a guide roller 10. It will be understood that the shaft 5 is of such length that these rollers 10 are spaced apart a distance substantially equal to the distance between the curbs B and that, when in operative position, these rollers bear against the inside surfaces of these curbs. Secured to the shaft 5 is a relatively short arm 11 to which is pivotally secured a rod 12, pivoted at its other end to a control lever 13. It will thus be seen that by manipulating the lever 13 the arms 8 and rollers 10 may be swung from an inoperative position, as shown in full lines in FIG. 3, to an operative position, as shown in dotted lines, in which operative position, as above stated, the rollers bear against the inside surfaces of the curbs B.

The purpose of these rollers 10 is to guide the tractor 1 when backing up, and this guiding structure, including the shaft 5 and arms 8, is made strong enough to shift the rear end of the tractor laterally when necessary so as to maintain the wheels parallel with the curbs.

Extending transversely of the tractor at the rear end thereof adjacent the shaft 5 is a transverse bar formed of telescoping sections 14 and 15. The sections 15 may be adjusted in and out of the central hollow portion 14, as desired, and secured in adjusted position by means of pins 17. The bar 14 is rigidly held by means of braces 16.

At the front of the tractor is secured a bracket 18 which supports another transverse bar formed of telesocping sections 19 and 20. The sections 20 are adjustable relative to the section 19 and may be secured in adjusted position by pins 21.

Adapted to fit between the curbs B on each side of each pit are separately fabricated scrapers 22. Each of these scrapers preferably comprises a pair of spaced vertical end plates 23 between which is mounted a scraping blade 25 pivotally mounted at its upper edge on a shaft 24. The scraper blade 25 normally occupies an inclined position, as shown in FIG. 5, in which it rests against a stop bar 26.

Each scraper 22 is detachably connected with the ends of the rear bar 14, 15 by means of a bridle comprising a pair of cables 27, and each scraper is connected to the ends of the bar 19, 20 by means of a similar bridle 28.

In operation, when it is desired to clean the accumulated droppings from the pits C, the operator runs the tractor along the aisle between the curbs B, so that the scrapers 22 can engage and move the mass of droppings. By virtue of the special mounting of the scraper blades 25, it will be seen that these blades engage the droppings when the tractor moves forwardly, but that when the tractor moves rearwardly these blades can swing up into dotted line position, as shown in FIG. 1, in which they ride over the droppings.

In order to facilitate removing the droppings from the building, it is advantageous to provide at the forward end of the pits and aisle a transversely extending endless conveyor 29, as shown in FIG. 1. This conveyor is located in a ditch or trough formed in the floor of the poultry house so that the scrapers can discharge the droppings into this trough and onto the conveyor so that the droppings can be carried away.

Instead of constructing a poultry house with a level floor and with curbs B secured thereto as described, the floor may be constructed with a raised portion M located between the pits L, this raised portion being of a width to accommodate the tractor wheels. With such a construction, the guide pulleys 10 engage the sides of the raised portion M, as shown in FIG. 7, and thus serve to prevent lateral displacement of the tractor wheels.

When, therefore, in the appended claims where I refer to "curbs," it will be understood that I mean either the longitudinally extending beams B, as shown in FIGS. 1 and 2, or the sides of the raised portion M, as shown in FIG. 7.

What I claim is:

1. In a poultry house having rows of elevated cages, with a pit having a hard, smooth floor extending beneath each row of cages, and an aisle between said pits separated therefrom by longitudinally extending curbs, apparatus for cleaning the droppings from the floors of said pits comprising a conventional farm type tractor adapted to travel along said aisle, and a separately fabricated scraper positioned in each pit on either side of said aisle, said scrapers being so connected with said tractor that they may be propelled thereby in either direction along said pits.

2. Cleaning apparatus in accordance with claim 1 in which each scraper comprises a transversely extending blade, and means for pivotally mounting said blade in such a manner that it performs its scraping function only when the tractor is moving forward, and swings up and rides over the droppings when the tractor is moving backward.

3. Cleaning apparatus in accordance with claim 1, in which the tractor has the usual steering gear, and in which additional means are provided for guiding the tractor when moving backward, so as to maintain it in said aisle.

4. Cleaning apparatus in accordance with claim 3 in which the additional guiding means is arranged to engage the sides of said curbs.

5. Cleaning apparatus in accordance with claim 3 in which the additional guiding means is pivotally mounted on the tractor at the rear thereof, and in which means are provided for swinging said guiding means from a raised inoperative position down into an operative position in engagement with the sides of said curbs.

6. Cleaning apparatus in accordance with claim 1 in which the means for connecting the scrapers with the tractor comprises a pair of transversely extending bars carried by the tractor, one at the front and the other at the rear, and projecting at each side thereof, said scrapers being secured to the ends of said bars and located between them, and means for adjusting the length of said bars so as to vary the lateral position of the scrapers as desired.

7. Cleaning apparatus in accordance with claim 1 in which the means for connecting the scrapers with the tractor comprises a pair of transversely extending bars carried by the tractor, one at the front and the other at the rear, said scrapers being located between said front and rear bars, and secured to them by means of bridles of flexible cables.

8. In a poultry house having rows of elevated cages, with a pit extending beneath each row of cages, and an aisle between said pits, apparatus for cleaning the dropping from the floors of said pits comprising a conventional farm type tractor adapted to travel along said aisle, and a separately fabricated, self-contained scraper positioned in each pit on either side of said aisle, and means for detachably connecting each of said scrapers with said tractor so that it may be propelled thereby.

References Cited in the file of this patent

UNITED STATES PATENTS

| | | |
|---|---|---|
| 2,307,984 | Brand | Jan. 12, 1943 |
| 2,946,309 | Page | July 26, 1960 |
| 2,970,567 | Rubin | Feb. 7, 1961 |
| 3,066,341 | Becker | Dec. 4, 1962 |